Jan. 9, 1945. W. R. GERGES 2,367,018
TANK CAR
Filed Feb. 19, 1942
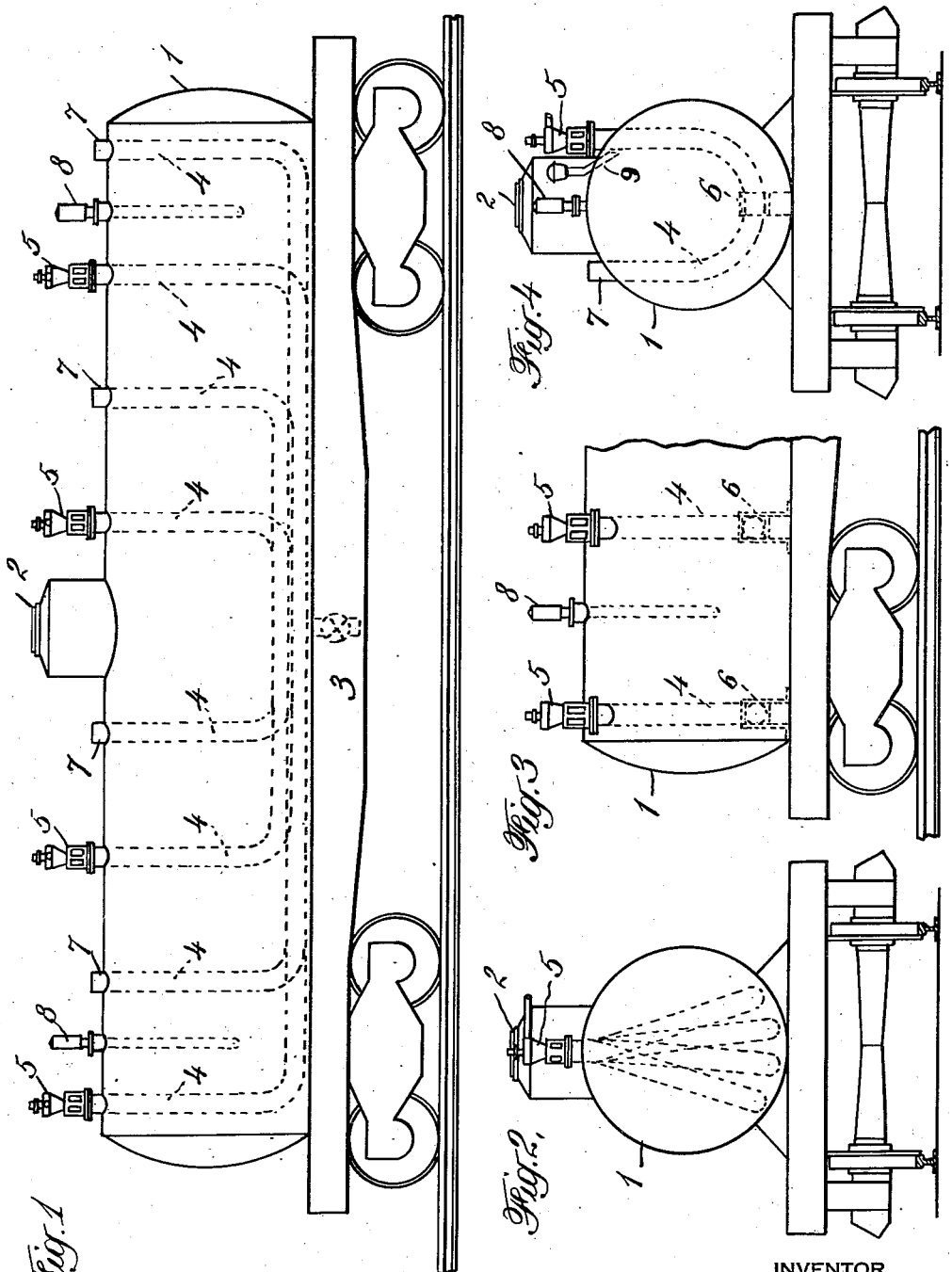
INVENTOR
Wesley R. Gerges
BY
Benjamin Sweedler
ATTORNEY Patented Jan. 9, 1945

2,367,018

UNITED STATES PATENT OFFICE 2,367,018

TANK CAR

Wesley R. Gerges, Philadelphia, Pa., assignor to Allied Chemical & Dye Corporation, New York, N. Y., a corporation of New York Application February 19, 1942, Serial No. 431,507

3 Claims. (Cl. 126—343.5)

This invention relates to a container such as a tank car for handling in molten form a solid material which generates vapors when heated, for example, a solid such as caustic soda containing a small proportion of water. The invention relates particularly to such container provided with novel heating members for melting the solid material.

Various devices have been proposed for handling in molten form material which is solid at ordinary temperatures. For example, tank cars have been equipped with steam coils so that material which has solidified during shipment may be melted and discharged from the car. For higher melting materials, it has also been proposed to provide a heating flue containing burners underneath the tank car, and in some cases hot combustion gases have been passed from such flues through ducts arranged to pass into and through the material contained in the car. It has not generally been considered practicable, however, to handle in molten form solids which generate vapors when heated, particularly relatively high melting solids such as caustic soda containing a small proportion of water. When it is attempted to melt such material in a tank car with heating means heretofore generally employed, localized heating and melting of the solid surrounding the heating coils or flues, i. e. at the bottom of the tank or in the interior of the body of material in the tank, has caused vapors to be generated in the heated zones and has formed pockets of such vapors in which undesirable pressures tend to build up. Furthermore, even anhydrous caustic soda when molten expands substantially on being heated, and extremely high and destructive pressures can be produced by heating molten caustic unless the molten material is suitably vented. Accordingly, it has not been customary to handle in molten form materials such as caustic soda, particularly caustic soda containing a small amount of water. Instead, caustic has been handled either as a relatively dilute solution, liquid at ordinary temperatures, or has been subjected to such costly operations as comminution or filling into drums for handling as a solid. Moreover, in devices heretofore emloyed for heating containers such as tank cars, the coils or flues have been so constituted that insufficient circulation and convection are induced in the partially melted material and harmful overheating has resulted, which in many cases has tended to impair the quality of the material as well as injure the container itself.

It is an object of this invention to provide a container such as a tank car or tank truck with heating means so designed that a relatively high-melting solid material, which tends to generate vapors when heated or which has a substantial coefficient of expansion when melted, may be handled advantageously in molten form, and particularly it is an object of the invention to provide such container with an efficient heating means for melting a high-melting material without impairing its quality or harming the container.

In accordance with my invention, I have devised a container such as a tank car for a high-melting solid material which generates vapors when heated or which has a substantial coefficient of expansion when melted, particularly a material such as caustic soda containing a small proportion of water. The container of my invention includes heating means comprising a conduit for the passage of a heating medium such as hot combustion gases, which conduit is so arranged that it enters substantially the upper surface of the body of material in the container, passes downwardly into the body of material, and thence out of the container, whereby material surrounding the conduit at the upper surface of the body of material is first melted and material in the neighborhood of the conduit is then melted progressively downwardly along the conduit to form a channel of molten material communicating with a space at the top of the container into which space the molten material may expand or through which channel vapors generated within the body of material may escape upwardly into the aforementioned space at the top of the container.

The container of my invention may advantageously be equipped with a heating conduit which consists of a U-shaped duct with both its inlet and discharge ends passing through an upper wall of the container and with the intermediate connecting portion of the heating conduit passing down into and through the body of material in the container. When employed in a tank car or tank truck, such a U-shaped duct may be arranged with its inlet and discharge ends mounted in and passing through the upper surface of the tank car, and may be mounted either transversely or longitudinally with respect to the axis of the car.

For purposes of illustration, there are shown in the accompanying drawing two embodiments of my invention, namely, tank cars which may be used, for example, for transporting caustic soda.

In the drawing,

Figure 1 is a side elevation of a tank car equipped with heating means consisting of U-shaped ducts arranged longitudinally with respect to the axis of the car;

Figure 2 is an end view of the tank car of Figure 1;

Figure 3 is a fragmentary side elevation of a tank car which is another embodiment of my invention and which contains U-shaped heating ducts arranged transversely with respect to the axis of the car; and Figure 4 is an end view of the tank car of Figure 3.

As indicated, my invention is characterized particularly by the arrangement of the heating duct so that it enters substantially the top of the container, passes into the body of material contained therein substantially at its upper surface, and in its continued path passes downwardly into the body of material and thence out of the container. With this arrangement, when a heating medium such as hot combustion gas is passed through the heating conduit to melt the solid material, for example, preparatory to discharging the contents of the container, the first solid material melted is the material in the neighborhood of the heating conduit in the top surface of the body of solid in the container. Material in the neighborhood of the conduit is thereafter melted progressively downwardly as the heating medium flows through the conduit. A channel of molten material is thus provided for the escape upwardly of vapors generated upon the heating of the solid. Because of the free path of escape for the vapors formed from the time the material first begins to melt or for expansion of molten material, the molten material or vapors do not build up high-pressure pockets within the body of material. Vents may be provided adjacent the heating conduits at their points of entry into the container for escape of the vapors into the atmosphere or for release of pressure. If the container has been filled so as to leave some headroom between the top surface of material and the top of the tank, this space may serve the purpose of a vapor header or expansion chamber and a vent may be provided at some central location at the top of the container, for example, within the dome that is usually provided at the top of a tank car.

Another feature of my invention is that the conduit is arranged advantageously for inducing circulatory currents in the molten material adjacent to the conduit, thus aiding in the transfer of heat by convection from the conduit surface to the more remote parts of the body of the solid. That is, an upward flow of heated molten material alongside the conduit is induced both by the upward passage of vapor being vented and by the vertical, or nearly vertical, path of a substantial section of the conduit, particularly when it first enters the body of material, which arrangement is particularly favorable for promoting thermal circulation. Other features of the design favoring the formation of circulatory currents are that the heating ducts have a relatively large diameter, and therefore a large heating surface is provided near the top of the material where the duct enters, and also the U-shaped design of heating conduit forms a large, substantially semi-circular path within the body of material, which is particularly favorable for inducing large circulatory currents of molten material throughout the body of material after a substantial amount of melting has taken place.

As indicated above, my invention relates to a container for handling a high-melting solid which tends to generate vapors when melted, for example, caustic soda containing a small proportion of water. Substantially anhydrous caustic, for example, melting above 300° C., may contain sufficient water to generate vapors when melted. In the case of such high-melting materials the vapors generated within a pocket of the material and not permitted to escape may attain a relatively high pressure and even exert an injurious effect on the container or mechanism associated with the container. The importance of this device for handling materials such as substantially anhydrous caustic soda is indicated by the fact that heretofore it has not been customary to handle caustic soda of high-melting point in the molten form, i. e. to ship the material in tank cars. Instead, as indicated above, caustic soda has generally been shipped either as a relatively dilute solution which remains liquid at ordinary temperatures, or it has been subjected to costly comminuting operations to obtain flakes or pellets, or poured into drums which may be handled separately.

Not only is it desirable to store and ship solids such as caustic soda in the substantially anhydrous form, and to handle them in molten form in tank cars, from the standpoint of reduced cost of handling and shipping, but also material in tank cars is not subjected to the atmospheric contamination to which comminuted solids with their large surfaces are subjected. Also, in the case of high-melting materials, the range of working temperature, i. e. ranging from the melting point up to incipient decomposition, is generally narrower than in the case of low-melting materials and the harmful effects of localized overheating are accordingly aggravated. In general, I have found the device of my invention is particularly advantageous for use with vapor-generating solids melting above 200° C. Examples of other materials for which the containers of the invention are suited, besides the caustic soda mentioned above, are salt mixtures, such as $KNO_3$ and $NaNO_2$, and high melting resins, such as cumarone resin.

Various heating media may be employed in the device of my invention. Steam at high pressure, for example, or vapors of higher boiling materials such as mercury may be employed as the heating media. I have generally found it preferable, however, to employ hot combustion gases for the high-melting materials for which my device is designed. The drawings illustrate one of the advantageous means for introducing such a heating medium into the heating ducts. As there indicated, an individual gas or oil burner may be mounted on each heating duct just above its point of entry into the container. This arrangement permits careful control of the heating within the body of material and is an efficient means for introducing the heating medium without substantial heat loss to the surroundings.

In the embodiments illustrated in the drawings, reference numeral 1 indicates a tank car having the conventional dome and charging manhole 2 and discharge valve 3. The tank car may advantageously be provided with insulation capable of resisting a temperature of 440°–500° C. In the illustrated embodiments of my invention, U-shaped heating ducts 4, provided with gas or oil burners 5 at their inlet ends.

are mounted in the tank car so that the ducts enter and leave along substantially the upper surface of the container and of the body of material within the container while the intermediate connecting portions of the ducts extend down into the body of material within the tank car. The ducts 4 may rest on suitable supports 6 at the base of the container, as shown in Figures 3 and 4. The spent combustion gases are discharged from the ducts at 7. Thermometer wells 8 may be provided at convenient points to determine the temperature of the contents and aid in controlling the heating of the contents of the tank car. Vents for escape of vapor and expansion zones for taking up expanded molten material may be provided in the top of the tank car adjacent the ends of the conduits 4. One such vent is indicated by reference numeral 9 in Fig. 4 of the drawings. Similar vents may be positioned adjacent each of the heating conduits 4 at their points of entry into the container. Alternatively, as indicated above, a space may be left in filling the tank car so that there is a continuous vapor space connecting the zones surrounding the ends of the heating conduits with the central dome of the tank car and a vent or safety valve may be provided in the dome.

In the embodiment illustrated in Figures 1 and 2, the U-shaped heating conduits are arranged longitudinally in the tank car, with the points of entry and discharge of the conduits substantially all in a line along the top of the tank car.

It will be noted from Figure 1 that the heating ducts in this embodiment of the invention are so disposed along the length of the container that a burner unit 5 of one heating duct alternates with the discharge end 7 of another heating duct, i. e., the four ducts shown in the construction of Figure 1 are so disposed that the first and third ducts, counting from left to right, have the burner ends 5 to the left of the central manhole 2 and their discharge ends 7 to the right of this manhole, whereas the second and fourth ducts have the burner ends 5 to the right of the central manhole 2 and their discharge ends to the left of this manhole.

In the embodiment illustrated in Figures 3 and 4, the U-shaped heating ducts are positioned transversely in the tank car and may be arranged as illustrated so that all the points of entry of the ducts are aligned in one upper quadrant along a generatrix of the cylindrical surface of the tank car while the outlets are similarly aligned in the other upper quadrant along another generatrix. Other arrangements of the heating ducts within the scope of the invention should be obvious to one skilled in the art in the light of the above discussion of the invention.

The operation of the devices illustrated in the drawings is substantially as follows: The tank car may be filled with a molten solid, for example, caustic soda containing a small proportion of water or anhydrous caustic. The material may be run in through the loading manhole 2, or may be pumped in through valve 3. The material may then be permitted to solidify within the tank car and may then be stored or shipped without subjecting the material to contamination by atmospheric moisture, carbon dioxide and other contaminating influences to which solid material loaded or shipped by other methods may be subjected. When it is desired to discharge the material, the burners 5 may be fired with oil or gas, or a heating medium from some other source may be passed through the ducts 4, whereupon the solid will be brought to a molten condition without formation of vapor pockets or localized overheating within the body of material. Vapors or molten material may be vented either adjacent the duct or in the central dome as indicated above. The temperature may be checked and the heating regulated accordingly. When the material in the tank car has been melted, it may be discharged in molten form through the valve 3, or may be siphoned or pumped out by means of a sump pump through the opening 2.

In shipping caustic soda or other materials presenting problems of corrosion or cleanliness, it may be advantageous to employ tank cars lined with nickel or other non-corrosive material and to construct the heating ducts of tubes, the outer surfaces of which are coated with similar non-corrosive material.

Although I have described my invention as applied to the transportation of caustic soda, it is obvious that it is capable of application to other high-melting materials, and that various structural modifications and arrangements of the container and its heating ducts may be made. It should also be clear that containers other than tank cars may come within the scope of my invention. For example, storage tanks or other containers employed in industrial operations for handling high-melting vapor-generating solids may be designed in accordance with my invention. Since certain changes may be made in the above construction and different embodiments of the invention could be made without departing from the scope thereof, it is intended that all matter contained in the above description or shown in the accompanying drawings shall be interpreted as illustrative and not in a limiting sense.

I claim:

1. In an enclosed tank adapted to contain high-melting material that generates vapors when heated, indirect heating means adapted to melt a charge of such material comprising a substantially U-shaped duct for the passage of heating medium and means for passing a heating medium through said duct, said duct having approximately vertical arms extending downwardly through the major portion of the depth of said tank, the duct being adapted to have its outer surface in direct contact with the main body of a charge of material in said tank and adapted to pass heating medium downwardly into such body of material in said tank whereby a channel of molten material is formed progressively downwardly surrounding said duct and vapors generated within the body of material freely escape upwardly through said channel, and venting means in the upper part of said tank adjacent to and communicating with the region inside the tank immediately outside said heating duct at the point of its entry into said tank for discharge of vapors rising out of said channel of molten material.

2. In an enclosed tank car having charging and discharging openings and adapted to contain material that melts at a temperature above 200° C. and that generates vapors when melted, indirect heating means adapted to melt a charge of such material comprising a plurality of substantially U-shaped ducts for the passage of heating medium and means for passing the heating medium through said ducts, said ducts having approximately vertical arms extending downwardly through the major portion of the depth of said tank car, the ducts being adapted to have their outer surfaces in direct contact with the main body of a charge of material in said tank car and adapted to pass heating medium downwardly into such a body of material in the tank car whereby a channel of molten material is formed progressively downwardly surrounding each of said ducts and vapors generated within the body of material freely escape upwardly through said channel, and venting means in the upper part of said tank car adjacent to and communicating with the region inside the tank car immediately outside each of said heating ducts at the point of its entry into said tank car for discharge of vapors rising out of the channel of molten material surrounding each of said ducts.

3. In a cylindrically enclosed tank having charging and discharge means and adapted to contain a normally solid mixture of caustic soda and water, indirect heating means adapted to melt a charge of such material comprising a substantially U-shaped conduit having arms for the entry and discharge of heating medium, said conduit following an approximately arcuate path within said tank substantially transverse to the longitudinal axis of the tank and having approximately vertical heating arms extending downwardly through the major portion of the depth of the tank, the conduit being adapted to have its outer surface in direct contact with the main body of a charge of material in said tank and adapted to pass heating medium downwardly into such a body of material in the tank whereby a channel of molten material is formed progressively downwardly surrounding said conduit and water vapor generated within the body of material freely escapes upwardly through said channel, and venting means in the upper part of said tank adjacent to and communicating with the region inside the tank immediately outside said conduit at the point of its entry into said tank for discharge of said water vapor rising out of said channel of molten material.

WESLEY R. GERGES.